(12) United States Patent
Hikosaka

(10) Patent No.: US 6,670,056 B2
(45) Date of Patent: Dec. 30, 2003

(54) PERPENDICULAR MAGNETIC RECORDING MEDIUM AND MAGNETIC READ/WRITE APPARATUS

(75) Inventor: Takashi Hikosaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/024,497

(22) Filed: Dec. 21, 2001

(65) Prior Publication Data

US 2002/0164501 A1 Nov. 7, 2002

(30) Foreign Application Priority Data

Dec. 25, 2000 (JP) ........................................ 2000-393411

(51) Int. Cl.[7] ............................... A11B 5/66; A11B 5/70
(52) U.S. Cl. ....................... 428/694 TS; 428/694 TM; 428/900
(58) Field of Search ....................... 428/694 T, 694 TS, 428/694 TM, 900

(56) References Cited

U.S. PATENT DOCUMENTS

| | | | |
|---|---|---|---|
| 4,995,024 A | 2/1991 | Arimune et al. | 369/13 |
| 5,326,637 A | * 7/1994 | Nasu et al. | 428/336 |
| 5,420,833 A | 5/1995 | Tanaka et al. | 369/13 |
| 5,645,911 A | 7/1997 | Matsumoto | 428/64.3 |
| 5,998,048 A | * 12/1999 | Jin et al. | 428/694 T |

FOREIGN PATENT DOCUMENTS

EP 0 330 394 2/1989

OTHER PUBLICATIONS

Takano et al., "A Practical Approach for Realizing High–Recording–Density Hard Disk Drives by Using Perpendicular," Digests of PMRC 2000, The Fifth Perpendicular Recording Magnetic Recording Confrence, Oct. 23–26, 2000, Sendai, Japan, pp. 129–130.
JP 08 069641 A, Mar. 12, 1996, Patent Abstracts of Japan.

* cited by examiner

*Primary Examiner*—Holly Rickman
(74) *Attorney, Agent, or Firm*—Pillsbury Winthrop LLP

(57) ABSTRACT

Disclosed is a perpendicular magnetic recording medium having magnetic characteristics by which an anisotropic magnetic field Hk and a saturation magnetization Ms satisfy the requirement $2<Hk/4\pi Ms<5$, letting $\alpha$ be the inclination of an MH loop when a magnetic field is applied perpendicularly, the anisotropic magnetic field Hk, the saturation magnetization Ms, and a coercive force Hc satisfy the requirement $0.01<\{(\alpha-1)Hc+4\pi Ms\}/Hk<0.2$, and a longitudinal residual magnetization Mr is less than 0.2 times the saturation magnetization Ms.

10 Claims, 7 Drawing Sheets

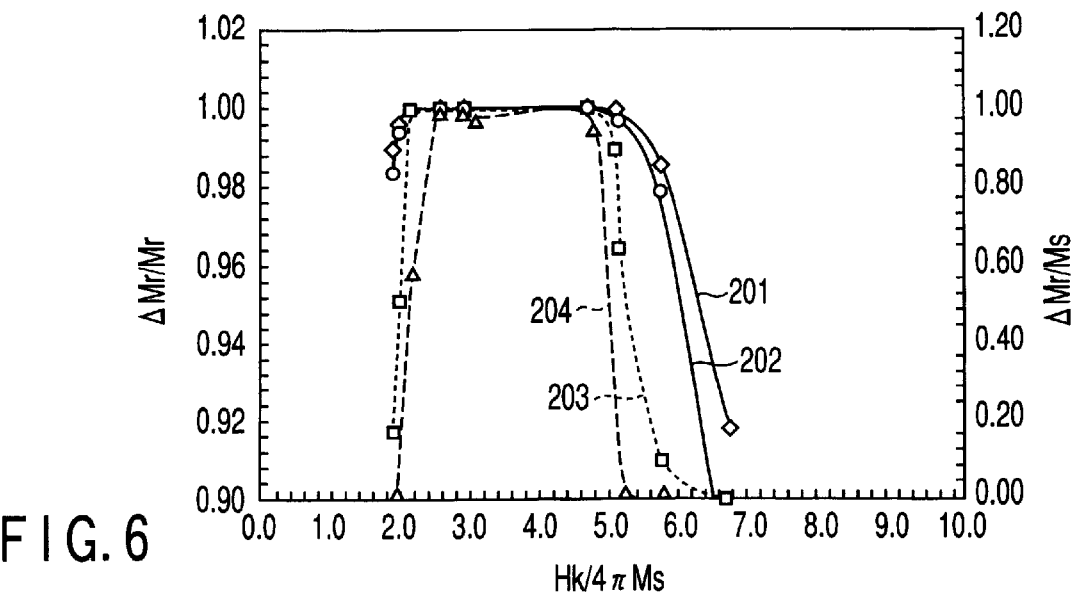
F I G. 6
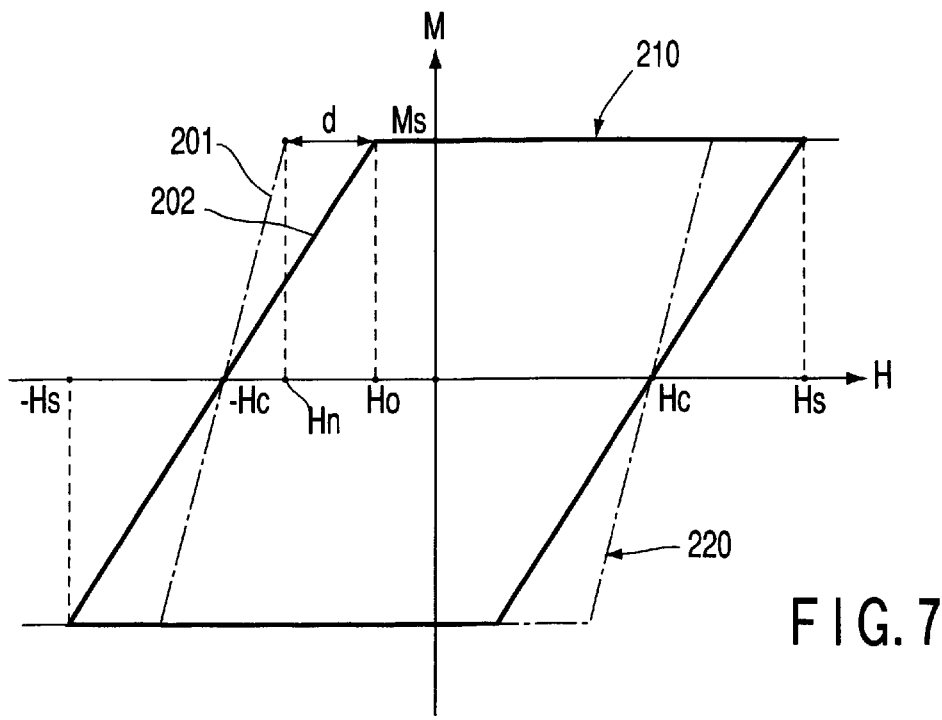
F I G. 7

PERPENDICULAR MAGNETIC RECORDING MEDIUM AND MAGNETIC READ/WRITE APPARATUS

CROSS-REFERENCE TO RELATED APPLICATIONS

This application is based upon and claims the benefit of priority from the prior Japanese Patent Application No. 2000-393411, filed Dec. 25, 2000, the entire contents of which are incorporated herein by reference.

BACKGROUND OF THE INVENTION

1. Field of the Invention

The present invention relates to a perpendicular magnetic recording type magnetic read/write apparatus and a perpendicular magnetic recording medium used in this apparatus.

2. Description of the Related Art

In improving magnetic recording density, it is beginning to prove difficult to reduce the medium noise while improving the thermal decay resistance.

One solution to this problem is to use a magnetic film medium whose magnetic anisotropic energy has been increased by means of a suitable material. However, if a material having an increased magnetic anisotropic field is used to increase the magnetic anisotropic energy of the magnetic film medium, a recording head cannot perform write operations well. On the other hand, if a material having a large saturation magnetization is used without increasing the magnetic anisotropic field, the magnetostatic action increases, making noise reduction difficult.

Meanwhile, a perpendicular magnetic recording system which records magnetization perpendicularly has been conventionally studied. In this system, unlike in longitudinal magnetic recording, no demagnetizing field from an adjacent bit acts on the magnetization transition region. Conversely, an adjacent bit helps stabilize magnetization in the magnetization transition region. Therefore, this perpendicular magnetic recording system is stable under a high-density recording conditions and hence is considered to be advantageous in high-density recording. Recently, this perpendicular magnetic recording has also come to be regarded as advantageous in thermal decay resistance, since a high resolution can be maintained even with a large film thickness compared to a longitudinal magnetic recording medium. Therefore, perpendicular magnetic recording is also beginning to attract attention in this respect. However, it is reported that in perpendicular magnetic recording, at a low-density, bits are strongly influenced by an internal demagnetizing field as a result of the thin film shape effect, so reduction of the read output is greater at low density. Accordingly, even in perpendicular magnetic recording it is necessary to study the thermal decay resistance.

Much as in a longitudinal magnetic recording medium, increasing the anisotropic energy of a magnetic film is effective in a perpendicular magnetic recording medium. However, this makes the writing of data by a head difficult. In addition, if the size of the magnetic grains of a perpendicular magnetic recording medium is decreased to reduce the transition noise, noise in the saturation magnetization region increases. This makes it difficult to increase the signal to medium noise ratio S/Nm itself.

BRIEF SUMMARY OF THE INVENTION

The present invention has been made to solve the above problems, and has as an object the provision of a perpendicular magnetic recording medium having a high thermal decay resistance of magnetic film grains and a high signal to medium noise ratio S/Nm.

A magnetic recording medium of the present invention comprises a substrate and a perpendicular magnetic layer formed on the substrate, wherein the magnetic recording medium has magnetic characteristics by which an anisotropic magnetic field Hk and a saturation magnetization Ms satisfy the condition $2<Hk/4\pi Ms<5$ . . . (1), letting $\alpha$ be the inclination of a hysteresis curve representing a change in magnetization M when a magnetic field H is applied in a direction perpendicular to the perpendicular magnetic layer, the anisotropic magnetic field Hk, the saturation magnetization Ms, and a coercive force Hc satisfy the condition $0.01<\{(\alpha-1)Hc+4\alpha Ms\}/Hk<0.2$ . . . (2), and a longitudinal residual magnetization Mr is less than 0.2 times the saturation magnetization Ms.

A magnetic read/write apparatus of the present invention comprises a magnetic recording medium, a driving means for supporting and rotating the magnetic recording medium, and a recording head which writes and reads data to and from the magnetic recording medium, wherein the magnetic recording medium comprises a perpendicular magnetic layer, and has magnetic characteristics by which an anisotropic magnetic field Hk and a saturation magnetization Ms satisfy the condition $2<Hk/4\pi Ms<5$ . . . (1), letting $\alpha$ be the inclination of a hysteresis curve representing a change in magnetization M when a magnetic field H is applied in a direction perpendicular to the perpendicular magnetic layer, the anisotropic magnetic field Hk, the saturation magnetization Ms, and a coercive force Hc satisfy the condition $0.01<\{(\alpha-1)Hc+4\pi Ms\}/Hk<0.2$ . . . (2), and the longitudinal residual magnetization Mr is less than 0.2 times the saturation magnetization Ms.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 is a graph showing the relationship between $Hk/4\pi Ms$ and the magnetization attenuation ratio $\Delta Mr/Mr$;

FIG. 7 is a schematic view showing an MH loop when a magnetic field is applied perpendicularly;

DETAILED DESCRIPTION OF THE INVENTION

Figure 1:
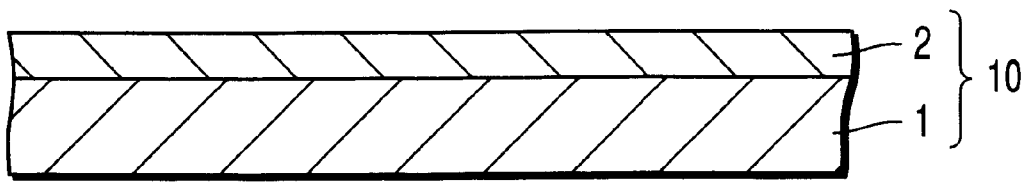
FIG. 1 is a view showing an example of the structure of a magnetic recording medium according to the present invention.

A magnetic recording medium of the present invention comprises a substrate and a perpendicular magnetic layer formed on the substrate. The magnetic characteristics of this magnetic recording medium meet the following three conditions.

According to the first condition, an anisotropic magnetic field Hk and a saturation magnetization Ms shall have the relationship represented by $2 < Hk/4\pi Ms < 5$ ... (1).

According to the second condition, letting $\alpha$ be the inclination of a hysteresis curve (MH loop) representing a change in magnetization M when a magnetic field H is applied in a direction perpendicular to the perpendicular magnetic layer, the anisotropic magnetic field Hk, the saturation magnetization Ms, and a coercive force Hc shall have the relation ship represented by $0.01 < \{(\alpha-1)Hc + 4\pi Ms\}/Hk < 0.2$ ... (2).

According to the third condition, a longitudinal residual magnetization Mr shall be less than 0.2 times the saturation magnetization Ms.

Also, a magnetic read/write apparatus of the present invention is an apparatus using the above-mentioned magnetic recording medium, and comprises the above magnetic recording medium, a driving mechanism to support and rotate the magnetic recording medium, and a recording head to write and read data to and from the magnetic recording medium.

First, in the present invention, the value of $Hk/4\pi Ms$ is set to be larger than 2 and smaller than 5. Consequently, changes in the anisotropic energy of the magnetic grains are canceled by changes in the demagnetizing field, and this equalizes the thermal decay resistances of the individual grains. This equalization of the thermal decay resistances of the individual grains eliminates variations in the magnetization transition positions and realizes a steep magnetization transition. This improves the recording resolution, reduces the medium noise, and thereby improves the signal to noise ratio.

Also, in the present invention, in addition to specifying the value of $Hk/4\pi Ms$, the condition $0.01 < \{(\alpha-1)Hc + 4\pi Ms\}/Hk < 0.2$ is satisfied when letting $\alpha$ be the inclination of an MH loop. This makes it possible to achieve a high thermal decay resistance and low noise in the transition region at the same time. This value of $\alpha$ is related to the inter-grain interaction, or to that demagnetizing field coefficient of a film, which is related to the grain size ratio of each individual magnetic grain of the film or the state of packing that is the ratio of grain diameter to grain height. Therefore, $\alpha$ is controlled by changing these factors. In addition, in the present invention, noise in the magnetization saturation region can also be reduced by further specifying the condition that the longitudinal residual magnetization be less than 0.2 times the perpendicular saturation magnetization.

The value of $Hk/4\pi Ms$ is preferably 2.5 to 4.5. As a consequence, a magnetic recording medium which better equalizes the thermal decay resistances of individual grains and hence is superior in thermal decay resistance is obtained.

The perpendicular magnetic layer preferably comprises a cobalt-platinum-based alloy magnetic layer to which at least one of chromium and oxygen has been added. When a magnetic layer having this composition is used, a perpendicular magnetic layer in which $Hk/4\pi Ms$ is larger than 2 and smaller than 5 is readily obtained, and $\alpha$ is easily changed.

FIG. 1 is a view showing an example of the structure of a magnetic recording medium according to the present invention.

As shown in FIG. 1, a magnetic recording medium 10 of the present invention comprises at least a substrate 1 and a perpendicular magnetic layer 2 formed on the substrate 1.

Preferably, this magnetic recording medium of the present invention incorporates, as an underlayer of the perpendicular magnetic layer, a stacked structure including a ruthenium-containing layer formed in a high-pressure argon atmosphere and a ruthenium-containing layer formed in a low-pressure argon atmosphere. The ruthenium-containing layer formed in a low-pressure argon atmosphere has the effect of obtaining high orientation of the magnetic layer. The ruthenium-containing layer formed in a high-pressure argon atmosphere has the effect of decreasing the grain size of the magnetic layer. When this underlayer is used, it is readily possible to change $\alpha$ and make the longitudinal residual magnetization amount Hr less than 0.2 times the perpendicular saturation magnetization Ms.

Figure 2:
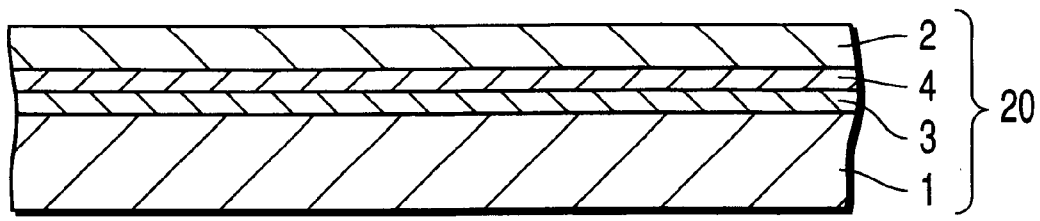
FIG. 2 is a view showing another example of the structure of the magnetic recording medium according to the present invention.

FIG. 2 is a view showing an example of the structure of a magnetic recording medium having an underlayer.

As shown in FIG. 2, in this magnetic recording medium 20, a ruthenium-containing layer 3 formed in a low-pressure argon atmosphere, a ruthenium-containing layer 4 formed in a high-pressure argon atmosphere, and a perpendicular magnetic layer 2 are formed in this order on a substrate 1.

A soft magnetic layer can also be formed between the perpendicular magnetic layer and the substrate, and this can further reduce the DC noise.

Figure 3:
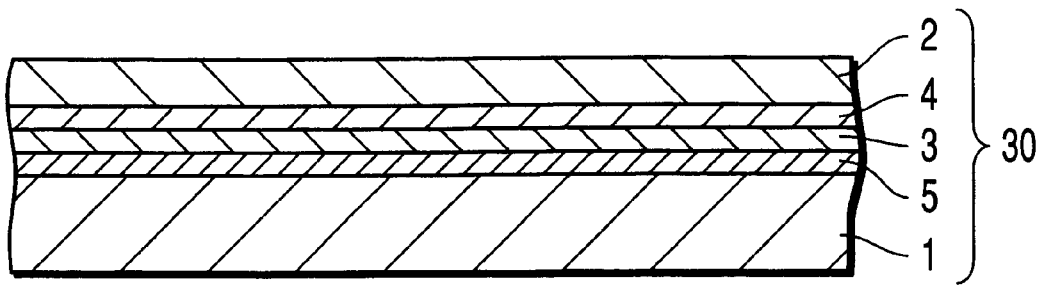
FIG. 3 is a view showing yet another example of the structure of the magnetic recording medium according to the present invention.

FIG. 3 is a view showing an example of the structure of a magnetic recording medium having a soft magnetic layer.

As shown in FIG. 3, in this magnetic recording medium 30, a soft magnetic layer 5, a ruthenium-containing layer 3 formed in a low-pressure argon atmosphere, a ruthenium-containing layer 4 formed in a high-pressure argon atmosphere, and a perpendicular magnetic layer 2 are formed on a substrate 1 in the order given.

In the present invention, an appropriate value of $Hk/4\pi Ms$ was obtained as follows.

Using a 2.5-inch-diameter chemically-enhanced aluminosilicate glass as a substrate, a Ti-based seed layer and an Ru-based underlayer were formed in the order given to improve the perpendicular orientation. A Co—Pt—Cr-based target was then used to form a Co—Pt—Cr—O-based perpendicular magnetic film by sputtering. In addition, a protective film of, for example, carbon and a lubricating layer of, for example, perfluoropolyether were formed in the order given to obtain a magnetic recording medium test sample.

The magnetic characteristics of this magnetic recording medium were measured by means of a vibrating sample magnetometer (VSM). The thermal decay resistance was evaluated by the change ΔMr/Mr in the residual magnetization Mr with time. This ΔMr/Mr is the magnetization ratio after the elapse of a predetermined time to the initial magnetization.

Also, this medium was used in combination with a ring-type write head and GMR read head to evaluate the overwrite modulation (OWM) and the signal to noise ratio S/Nm.

The magnetic characteristics of the film were controlled by changing the composition of the Co—Pt—Cr target and the film formation conditions. The OWM was measured by recording 200 FCI on 100 kFCI with respect to a write electric current at which the output of 10 kFCI was maximum.

The signal to noise ratio S/Nm was calculated by converting it to a value corresponding to a track width of 1 μm, as the ratio of the peak-to-peak value of the obtained dipulse of 10 kFCI to the rms noise value.

Figure 5:
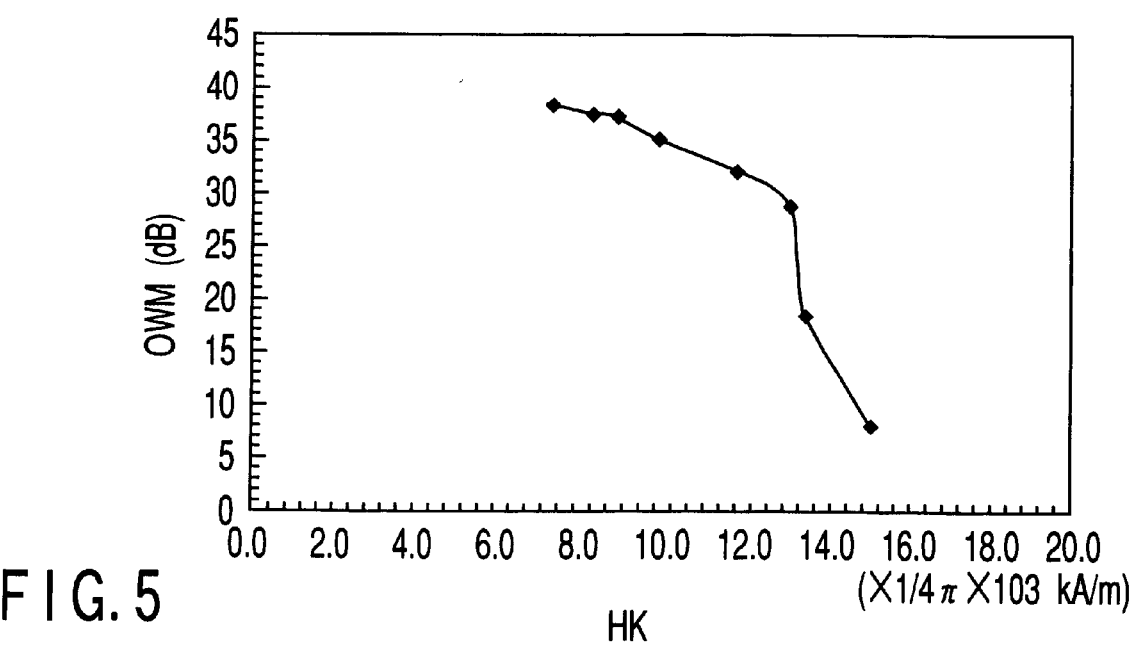
FIG. 5 is a graph showing the relationship between Hk and OWM when Hk is changed.

FIG. 5 is a graph showing the relationship between Hk and the OWM when Hk was changed.

As shown in FIG. 5, under conditions by which the OWM was 32 dB or more during writing, Hk was as good as about 960K A/m or less in the combination of this head and this Co—Pt—Cr—O-based perpendicular magnetic layer.

Accordingly, for one target composition for which Hk was approximately 960K A/m, magnetic layers were formed by variously changing the film formation conditions, for example, the burr during sputtering, the internal pressure and internal oxygen amount of the sputtering chamber, the substrate temperature during sputtering, and the time before the start of sputtering, thereby forming samples 1-1 to 1-11 as magnetic recording media. The Cr composition was 16 at %; the Pt composition, 20 at %; and the oxygen concentration in each magnetic layer obtained, 30 at %.

To evaluate the signal to noise ratio S/Nm and the thermal decay resistance of each sample, the attenuation ratio (ΔMr/Mr) of the residual magnetization Mr was measured after elapses of different times. Also, PW50 (nm) by which the recording resolution was given was obtained from a half-width value by differentiating an isolated read signal.

Table 1 below shows the values of Hk, 4πMs, Hk/4πMs, signal to noise ratio S/Nm, thermal decay resistance (ΔMr/Mr), signal to noise S/N ratio, and PW50 for each medium fabricated.

TABLE 1

| Sample | Hk/4 π Ms | ΔMr/Mr After 6000 sec. | After 9000 sec. | After 1000000 sec. | After 100000000 sec. | So/Nm (dB) | PW50 (nm) |
| --- | --- | --- | --- | --- | --- | --- | --- |
| 1-1 | 6.63 | 0.917 | 0.879 | 0.000 | 0.000 | 22.2 | 132 |
| 1-2 | 5.654206 | 0.986 | 0.979 | 0.091 | 0.000 | 23.1 | 124 |
| 1-3 | 5.03 | 0.997 | 0.996 | 0.642 | 0.000 | 24.2 | 119 |
| 1-4 | 4.98 | 0.999 | 0.999 | 0.892 | 0.000 | 25.3 | 98 |
| 1-5 | 4.63 | 1.000 | 1.000 | 0.999 | 0.933 | 26.2 | 97 |
| 1-6 | 2.96 | 1.000 | 1.000 | 1.000 | 0.961 | 27.3 | 99 |
| 1-7 | 2.8 | 1.000 | 1.000 | 1.000 | 0.979 | 28.2 | 95 |
| 1-8 | 2.49 | 1.000 | 1.000 | 1.000 | 0.984 | 28 | 97 |
| 1-9 | 2.09 | 1.000 | 1.000 | 0.994 | 0.575 | 26.8 | 98 |
| 1-10 | 1.9 | 0.996 | 0.994 | 0.514 | 0.000 | 24.2 | 123 |
| 1-11 | 1.82 | 0.990 | 0.984 | 0.171 | 0.000 | 23.8 | 129 |

Note that Hk is determined as a value obtained from a longitudinal MH loop.

Figure 4:
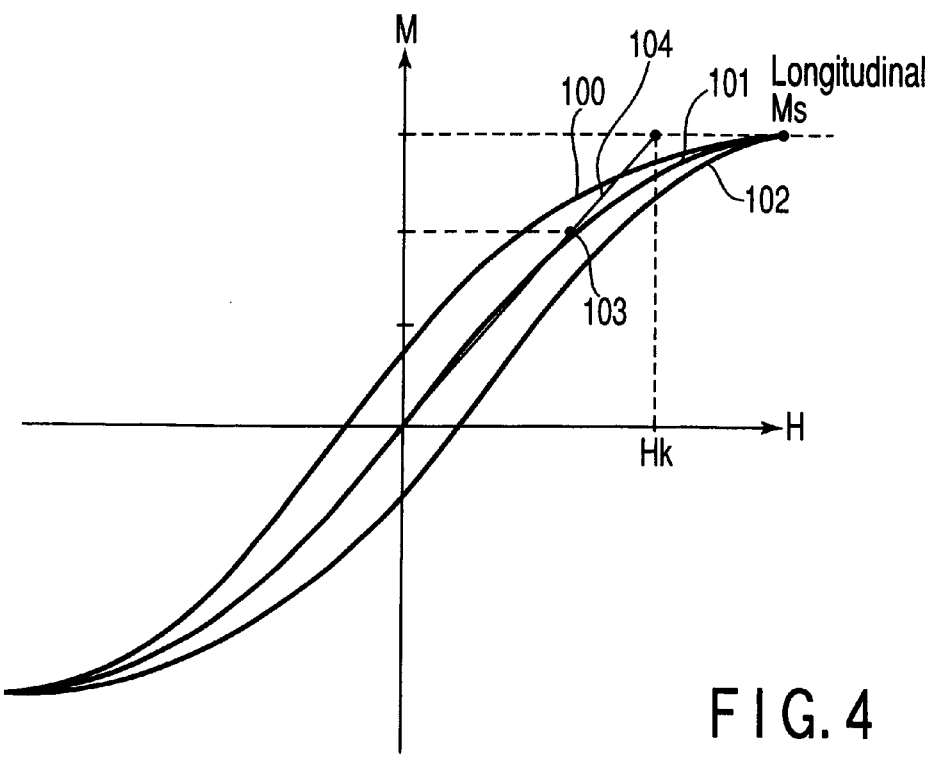
FIG. 4 is a graph showing an MH loop when a magnetic field is applied in a longitudinal direction.

FIG. 4 is a graph showing an MH loop when a magnetic field is applied in the longitudinal direction.

As shown in FIG. 4, Hk used in the present invention is defined by a magnetic field when a straight line 104 connecting a point 103 and the origin indicates a saturation magnetization amount. Specifically, a longitudinal MH loop is measured, and a curve 101 is obtained which is the average of a curve 100 on the positive magnetization application side and a curve 102 on the negative magnetization application side. The point 103 is a point at which the magnetization amount is ⅔ the longitudinal saturation magnetization Ms on this curve 101.

Also, changes in the residual magnetization Ms were obtained by applying a magnetic field of 1,440 A/m once in a perpendicular direction, measuring the change in the residual magnetization Mr with this magnetic field removed, and measuring changes in the residual magnetization Mr after 6,000 and 9,000 sec. From this result, changes in the magnetization amount after $1 \times 10^6$ and $1 \times 10^8$ sec were estimated.

FIG. 6 is a graph showing the relationship between Hk/4πMs, the magnetization amount attenuation ratio ΔMr/Mr, and Δlongitudinal Mr/perpendicular Ms of each of samples 1-1 to 1-11.

In FIG. 6, reference numeral 201 denotes a curve indicating ΔMr/Mr after an elapse of 6,000 sec; 202, a curve indicating ΔMr/Mr after an elapse of 9,000 sec; and 203 and 204, curves indicative of estimated values of changes in the magnetization amount after elapses of $1 \times 10^6$ and $1 \times 10^8$ sec, respectively.

As shown in FIG. 6, the relationship between changes in Hk/4πM and Mr with time was that when Hk/4πMs was 2 to 5, changes in Mr were almost negligible. However, when Hk/4πMs was smaller than 2 or larger than 5, large changes were found in Mr, indicating a deterioration of the thermal decay resistance.

Changes in the magnetization amount after $1 \times 10^6$ and $1 \times 10^8$ sec were estimated from changes in Mr after 6,000 and 9,000 sec. Consequently, it was expected that after $1 \times 10^6$ sec, the change in magnetization amount was within 10% when the condition is 2<4πMS<5, but abruptly increased beyond the condition, and, after $1 \times 10^8$ sec, the change in magnetization amount was within 10% when the condition is 2.5<4πMs<4.5 and abruptly increased beyond the condition.

When Hk/4πMs was smaller than 2 or larger than 5, the change in magnetization amount decreased if Hk was increased. In this case, however, the OWM dropped as in the case shown in FIG. 5.

In MH loop shapes (not shown) for the individual media measured with the VSM, when Hk/4πMs was 2 to 5, the slope of the shoulder of a perpendicular MH loop was small. For other media, the shoulders of perpendicular MH loops were sloped and rounded. This means that when Hk/4πMs is 2 to 5, the thermal decay resistances of the magnetic grains are uniform.

Accordingly, as shown in Table 1, when Hk/4πMs was 2 to 5, the signal to noise ratio S/Nm was 25 dB or more and PW50 (nm), at 100 nm or less, was also a good value.

From the above results, it is found that a medium having a high thermal decay resistance is obtained by setting the value of Hk/4πMs so that 2<Hk/4πMs<5, or preferably, 2.5<Hk/4πMs<4.5, as the characteristic of the perpendicular magnetic film.

In a Co—Pt—Cr—O-based perpendicular magnetic layer, the composition ratio is preferably 30 to 88 atm % of Co, 12 to 36 atm % of Pt, 0 to 20 atm % of Cr, and 0 to 40 atm % of O. If the composition ratio falls outside this range, Hk or Ms often drops too much.

In the present invention, an appropriate value of $\{(\alpha-1)Hc+4\pi Ms\}/Hk$ is also defined in addition to the appropriate value of Hk/4πMs described above.

FIG. 7 is a schematic view showing an MH loop when a magnetic field is applied in a direction perpendicular to a perpendicular magnetic recording medium, assuming that Hk/4πMs has an appropriate magnetic characteristic and the magnetic grains have no interaction.

Referring to FIG. 7, a line 201 is a straight line representing the negative magnetization application side of an MH loop 220 when a magnetic field is applied in a direction perpendicular to the perpendicular magnetic recording medium according to the present invention. In an MH loop for the medium of the present invention, the ratio Hc/Hn of the coercive force Hc of a magnetic field to the intensity of the magnetic field, when the inversion of this magnetic field ideally occurs on the negative magnetization application side, is the inclination α of the MH loop.

Hn is a magnetic field by which the line 201 has the value of Ms, and ideally represents an applied magnetic field by which the MH loop 220 starts inverting. $H_0$ is represented by −Hc+4πMs and indicates the intensity of a magnetic field when the magnetization amount of a line 202 having an inclination of (−Hs+4πMs)/−Hc is the saturation magnetization amount Ms. The expression (α−1)Hc+4πMs represents a difference d between Hn and $H_0$. In the present invention, it is possible to simultaneously achieve a high thermal decay resistance and low noise in the transition region by setting the ratio of (α−1)Hc+4πMs to Hk to 0.01 to 0.2.

If $\{(\alpha-1)Hc+4\pi Ms\}/Hk$ is less than 0.01, the thermal decay resistance is unsatisfactory. If $\{(\alpha-1)Hc+4\pi Ms\}/Hk$ exceeds 0.2, the transition noise increases.

Furthermore, the present invention specifies that the longitudinal residual magnetization Mr be 0.2 times or less the perpendicular saturation magnetization Ms. If the longitudinal residual magnetization Mr exceeds 0.2 times, noise in the saturation magnetization region increases.

The above magnetic recording medium can be applied to a magnetic read/write apparatus as described below.

Figure 8:
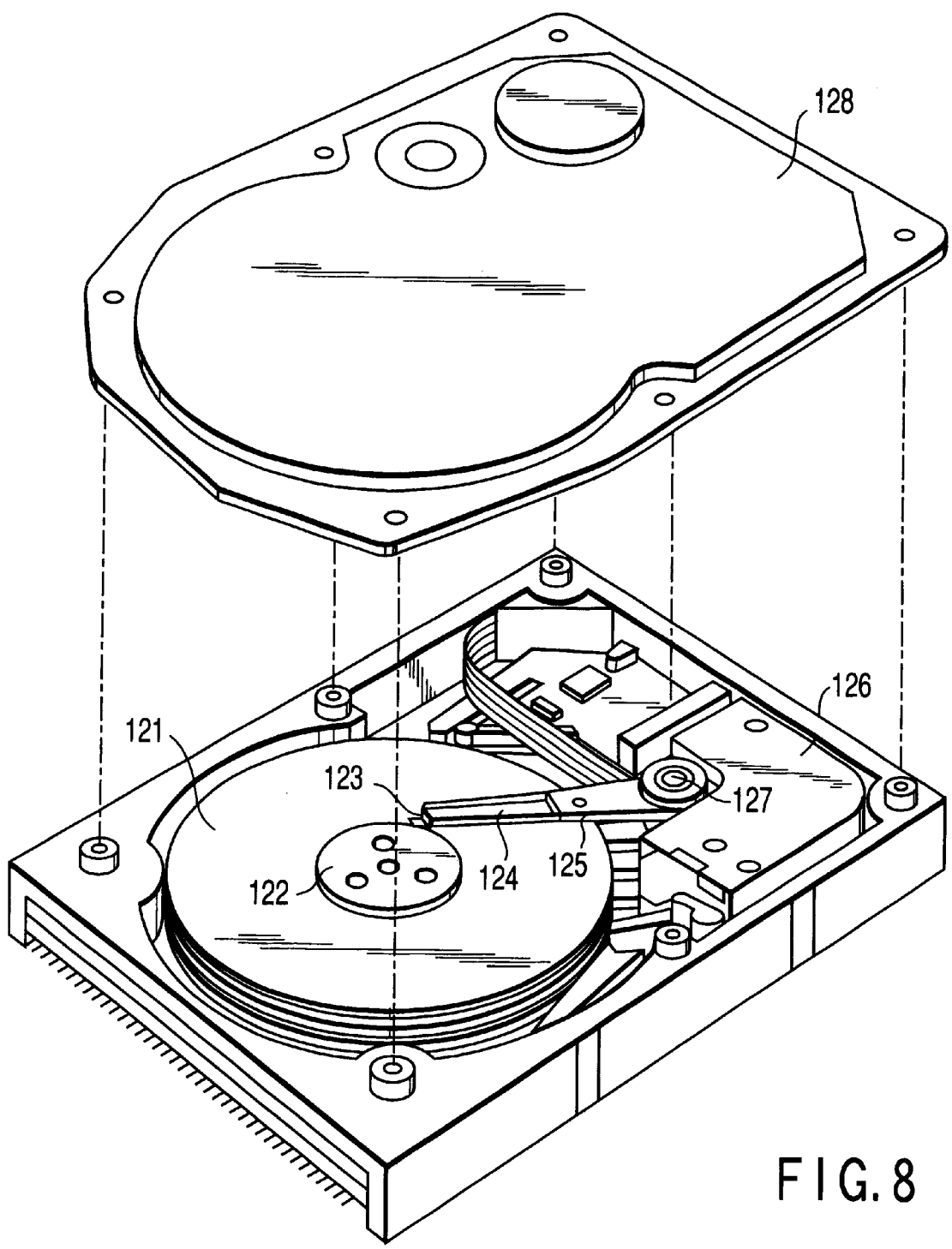
FIG. 8 is a view showing yet another example of the structure of the magnetic recording medium according to the present invention.

FIG. 8 is a partially exploded perspective view showing an example of the magnetic read/write apparatus according to the present invention. A rigid magnetic disk 121 for recording information according to the present invention is mounted on a spindle 122 and rotated at a constant angular velocity by a spindle motor (not shown). A slider 123 on which are mounted a single-pole recording head for accessing the magnetic disk 121 to write data and an MR head to read data is attached to the distal end portion of a suspension 124 which is a thin plate-like leaf spring. This suspension 124 is connected to one end of an arm 125 having a bobbin or the like around which a driving coil (not shown) is wound.

A voice coil motor 126, functioning as a kind of linear, motor is placed at the other end of the arm 125. This voice coil motor 126 is composed of the driving coil (not shown) wound around the bobbin of the arm 125, and a magnetic circuit including a permanent magnet and counter yoke opposing each other on the two sides of the driving coil.

The arm 125 is held by ball bearings (not shown) arranged in two, upper and lower portions of a fixed shaft 127, and is driven to swing by the voice coil motor 126. That is, the position of the slider 123 above the magnetic disk 121 is controlled by the voice coil motor 126. Reference numeral 128 in FIG. 8 denotes a lid.

Figure 9:
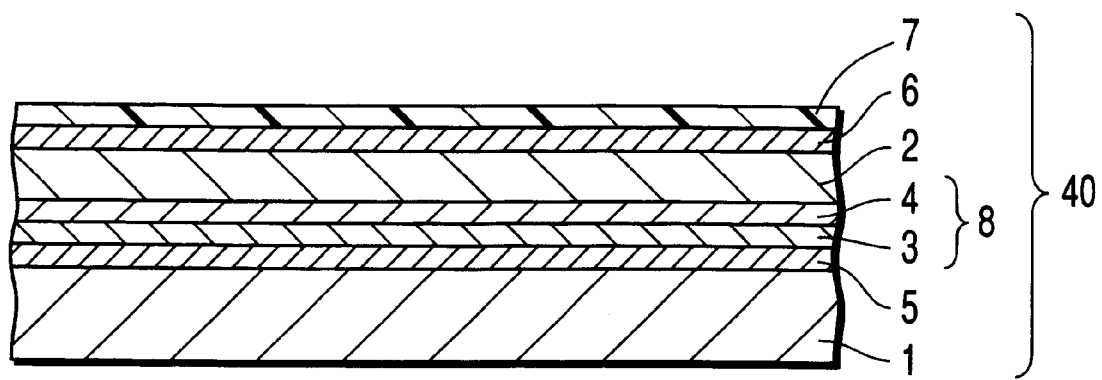
FIG. 9 is a view showing an example of a magnetic read/write apparatus according to the present invention.

FIG. 9 is a schematic view showing an example of the structure of the perpendicular magnetic recording medium according to the present invention.

As shown in FIG. 9, in this magnetic recording medium 40, a seed layer 5 of, for example, a titanium alloy, a ruthenium-containing layer 3 formed in a low-pressure argon atmosphere, a ruthenium-containing layer 4 formed in a high-pressure argon atmosphere, and a perpendicular magnetic layer 2 of, for example, a Co—Pt—Cr—O-based alloy are deposited on a substrate 1 in the order given.

This magnetic recording medium 40 was formed as follows.

First, 2.5-inch-diameter chemically-enhanced aluminosilicate glass was prepared as a substrate 1. On this substrate 1, a Ti alloy was sputtered to form a seed layer 5. An Ru alloy was then formed on this soft magnetic layer 5 by two-step sputtering, forming an underlayer 8; that is, a first Ru layer 3 was sputtered at a low Ar pressure, and a second Ru layer 4 was sputtered at a high Ar pressure. After the underlayer was thus formed, a Co—Pt—Cr-based target of composition $Co_{64}Pt_{20}Cr_{16}$ was used to form a Co—Pt—Cr—O-based perpendicular magnetic layer by sputtering in which a slight amount of gaseous oxygen was added at a high sputtering pressure. In addition, a protective film of carbon and a lubricating layer of perfluoropolyether were formed to obtain the perpendicular magnetic recording medium according to the present invention.

The perpendicular and longitudinal magnetic characteristics of the perpendicular magnetic recording medium thus obtained were measured by means of a vibrating sample magnetometer (VSM). From these measurements, Hk, 4πMs, $\{(\alpha-1)Hc+4Ms\}/Hk$, and the longitudinal Mr/perpendicular Ms ratio of the longitudinal residual magnetization Mr to the perpendicular saturation magnetization Ms were calculated. The results obtained are shown in Table 2 below.

Also, the structure of each magnetic recording medium described above was modified by stacking a thin FeAlSi film and a nonmagnetic film between the substrate and the titanium alloy to form a soft Fe—Al—Si magnetic layer, thereby obtaining a magnetic recording medium.

Figure 10:
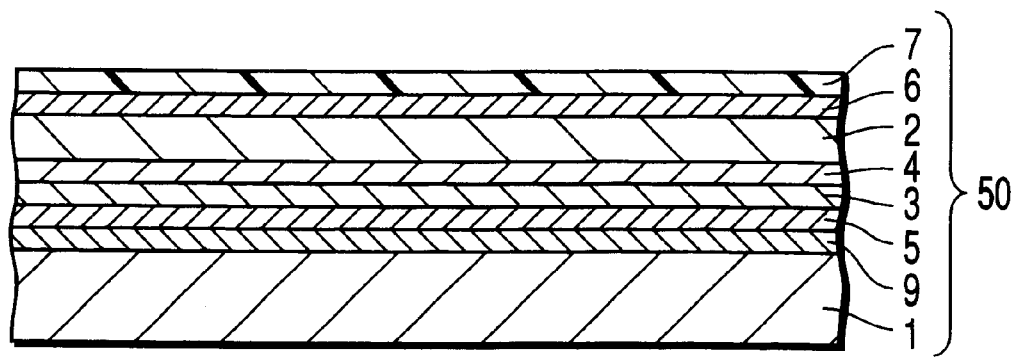
FIG. 10 is a view showing yet another example of the structure of the magnetic recording medium according to the present invention.

FIG. 10 is a view showing the structure of the magnetic recording medium thus obtained.

As shown in FIG. 10, in this magnetic recording medium 50, a soft magnetic layer 9, a seed layer 5 of a titanium alloy, a ruthenium-based layer 3 formed in a low-pressure argon atmosphere, a ruthenium-containing layer 4 formed in a high-pressure argon atmosphere, and a perpendicular magnetic layer 2 of, for example, a Co—Pt—Cr—O-based alloy are formed on a substrate 1 in the order given.

Figure 11:
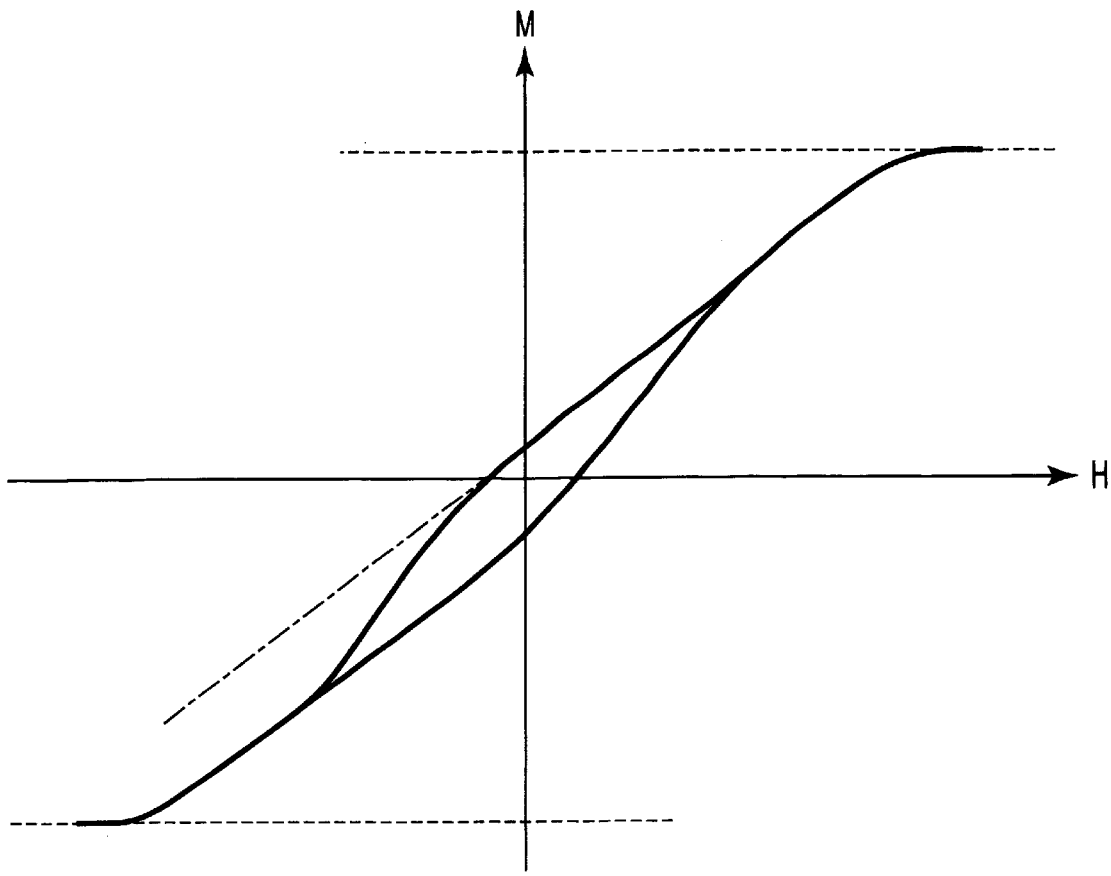
FIG. 11 is a view showing an MH loop of a perpendicular magnetic recording medium incorporating a soft magnetic layer.
Figure 12:
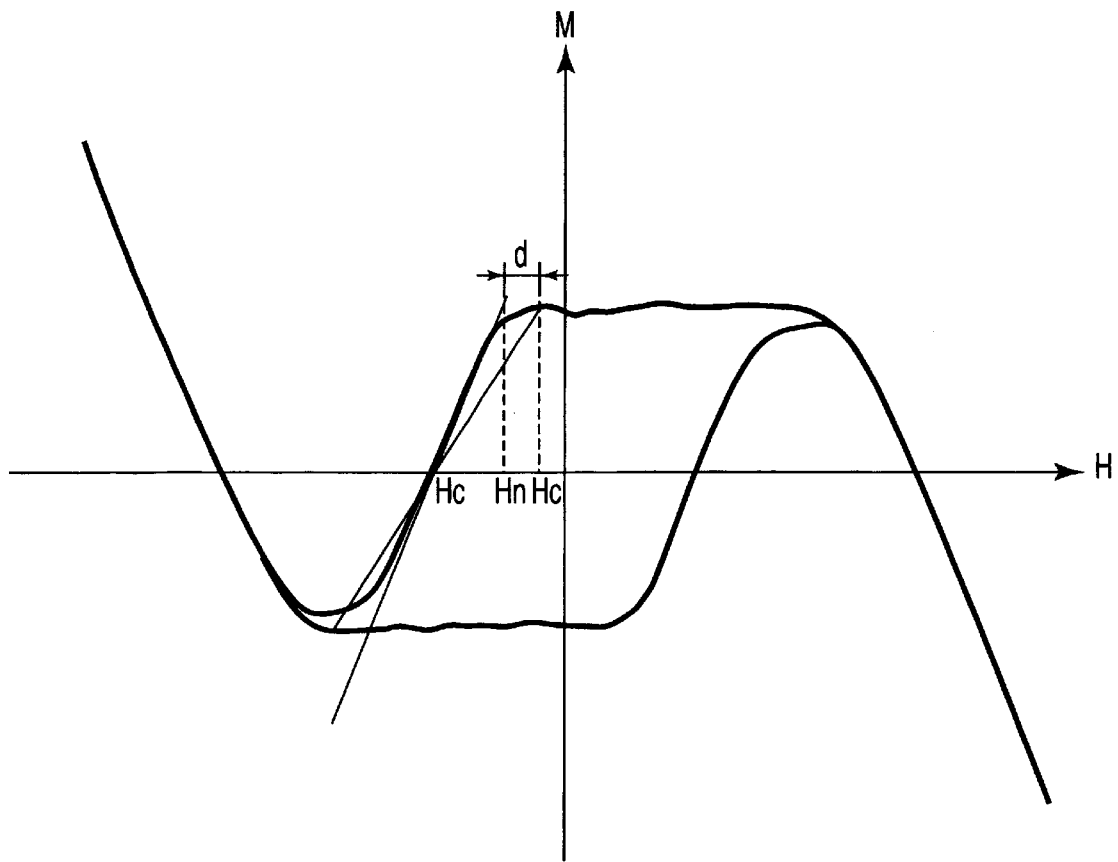
FIG. 12 is a view showing an MH loop obtained by correcting FIG. 11.

An MH loop when a magnetic field is applied in a perpendicular direction to the perpendicular magnetic layer of the perpendicular magnetic recording medium having the soft magnetic layer is obtained by correcting the inclination of magnetization from the saturation of the perpendicular magnetic layer to the saturation of the soft magnetic layer. FIG. 11 shows an MH loop before the correction, and FIG. 12 shows an MH loop after the correction. From FIG. 12, the values of $H_0$, Hc, Ms, and $\underline{d}$ can be obtained in a similar way to those obtained in FIG. 7.

The read/write (R/W) characteristics were evaluated by applying the combination of a perpendicular write head and a GMR read head to the magnetic recording medium obtained.

The results are shown in Table 2 below. The signal-to-medium noise ratio S/Nm was calculated by considering the total noise and system noise as the medium noise. The signal-to-transition region noise ratio S/Ntr was calculated from the medium noise Nm and the medium DC noise Ndc. S is the value from zero to the peak of the signal.

For comparison, samples 2-1 to 2-5 of magnetic recording media were formed by following the same procedures as those described above except that the film formation conditions of the underlayer 8 were changed in order to change the magnetic characteristics of the magnetic layer.

In samples 2-1 to 2-4, the Ru alloy underlayer was formed by changing the film formation pressure of Ru without performing two-step sputtering. In sample 2-5, the Ru film was formed by two-step sputtering, a first Ru film being formed at high pressure and a second Ru film being formed at low pressure.

These magnetic recording media were evaluated in the same manner as for the present invention. The results are shown in Tables 2 and 3.

if the sputtering pressure was low. Also, when the Ru pressure was changed as in samples 2-2 to 2-4, the requirement that longitudinal Mr/perpendicular Mr<0.2 and, at the same time, $0.01<\{(\alpha-1)Hc+4\pi Ms\}/Hk<0.2$ was not met. Furthermore, even when the Ru film was formed by two-step sputtering as in Comparative Example 5, the requirement that longitudinal Mr/perpendicular Mr<0.2 was not met if the first film was formed at a high sputtering pressure and the second film was formed at a low sputtering pressure.

Differences between film structures formed at low and high sputtering pressures can be the orientation of Ru, the orientation of the recording layer deposited on Ru, and reduction in the size of the magnetic grains.

In the media of the present invention, good orientation and reduction in the size of the magnetic grains were found from TEM and TED images.

TABLE 3

| Sample | First underlayer | Second underlayer | Medium SNm (dB) | Medium SNtr (dB) | Medium SNdc (dB) |
|---|---|---|---|---|---|
| 2-1 | Ru 15 nm (0.6 Pa) | Ru 10 nm (10 Pa) | 25.04 | 29.62 | 26.9 |
| 2-2 | Ru 25 nm (0.6 Pa) | None | 20.96 | 21.49 | 30.37 |
| 2-3 | Ru 25 nm (2 Pa) | None | 22.01 | 22.74 | 30.11 |
| 2-4 | Ru 25 nm (6 Pa) | None | 21.2 | 27.32 | 22.41 |
| 2-5 | Ru 25 nm (10 Pa) | None | 20.63 | 29.59 | 22.72 |
| 2-6 | Ru 15 nm (10 Pa) | Ru 10 nm (0.6 Pa) | 22.74 | 27.25 | 21.22 |

From Tables 2 and 3, when $\{(\alpha-1)Hc+4\pi Ms\}/Hk$ was larger than 0.01 and smaller than 0.2 as in the present invention and in samples 2-3 to 2-5, the signal-to-transition region noise ratio S/Ntr was 26 dB or more, a very satisfactory value. This allows a perpendicular head to write bits having good magnetization.

In addition, when longitudinal Mr/perpendicular Ms was less than 0.2 as in the present invention and in samples 2-1 and 2-2, the signal-to-DC noise ratio S/Ndc was high.

TABLE 2

| Sample | First underlayer | Second underlayer | Hk (× 1/4 π × $10^3$k A/m) | 4 π Ms | $((\alpha-1) \cdot Hc - 4\pi Ms)/Hk$ | Mr (//)/Ms (⊥) | Hk/4 π Ms |
|---|---|---|---|---|---|---|---|
| 2-1 | Ru 15 nm (0.6 Pa) | Ru 10 nm (10 Pa) | 11 | 320 | 0.127 | 0.18 | 2.74 |
| 2-2 | Ru 25 nm (0.6 Pa) | None | 11 | 350 | 0.22 | 0.16 | 2.5 |
| 2-3 | Ru 25 nm (2 Pa) | None | 11 | 240 | 0.2 | 0.19 | 2.57 |
| 2-4 | Ru 25 nm (6 Pa) | None | 11 | 320 | 0.19 | 0.2 | 2.74 |
| 2-5 | Ru 25 nm (10 Pa) | None | 10.5 | 300 | 0.09 | 0.35 | 2.78 |
| 2-6 | Ru 15 nm (10 Pa) | Ru 10 nm (0.6 Pa) | 10.8 | 330 | 0.1 | 0.25 | 2.61 |

As shown in Table 2, in all the media the value of Hk/4πMs was larger than 2 and smaller than 5. The media of the present invention met the requirement that longitudinal Mr/perpendicular Mr<0.2 and, at the same time, $0.01<\{(\alpha-1)Hc+4\pi Ms\}/Hk<0.2$. However, when the Ru film was formed by one-step sputtering and the pressure during the formation of this Ru film was changed as in sample 2-1, the value of longitudinal Mr/perpendicular Ms was small but the value of $\{(\alpha-1)Hc+4\pi Ms\}/Hk$ increased As described above, the signal-to-medium noise ratio S/Nm increased when Hk/4πMs was larger than 2 and smaller than 5 and the requirement regarding both the value of $\{(\alpha-1)Hc+4\pi Ms\}/Hk$ and the longitudinal Mr/perpendicular Ms ratio was met.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A magnetic recording medium comprising a substrate and a perpendicular magnetic layer formed on said substrate, wherein said magnetic recording medium has magnetic recording characteristics by which an anisotropic magnetic field Hk and a saturation magnetization Ms satisfy the condition $2<Hk/4\pi Ms<5$ ... (1), letting $\alpha$ be the inclination of a hysteresis curve representing a change in magnetization M when a magnetic field H is applied in a direction perpendicular to said perpendicular magnetic layer, the anisotropic magnetic field Hk, the saturation magnetization Ms, and a coercive force Hc satisfy the condition $0.01<\{(\alpha-1)Hc+4\pi Ms\}/Hk<0.2$ ... (2), and a longitudinal residual magnetization Mr is less than 0.2 times the saturation magnetization Ms.

2. A medium according to claim 1, wherein said perpendicular magnetic layer comprises a cobalt-platinum-based magnetic layer which contains at least either chromium or oxygen.

3. A medium according to claim 1, further comprising an underlayer having a stacked structure including a ruthenium-containing layer formed in a high-pressure argon atmosphere and a ruthenium-containing layer formed in a low-pressure argon atmosphere.

4. A medium according to claim 3, comprising a soft magnetic layer formed between said perpendicular magnetic layer and said underlayer.

5. A medium according to claim 1, wherein the value of $Hk/4\pi Ms$ in equation (1) is preferably 2.5 to 4.5.

6. A magnetic read/write apparatus comprising:

a perpendicular magnetic recording medium;

a driving mechanism to support and rotate said perpendicular magnetic recording medium; and a single-pole recording head to write data on said perpendicular magnetic recording medium, wherein said perpendicular magnetic recording medium comprises a perpendicular magnetic layer, and has magnetic characteristics by which an anisotropic magnetic field Hk and a saturation magnetization Ms satisfy the condition $2<Hk/4\pi Ms<5$ ... (1), letting $\alpha$ be the inclination of a hysteresis curve representing a change in magnetization M when a magnetic field H is applied in a direction perpendicular to said perpendicular magnetic layer, the anisotropic magnetic field Hk, the saturation magnetization Ms, and a coercive force Hc satisfy the condition $0.01<\{(\alpha-1)Hc+4\pi Ms\}/Hk<0.2$ ... (2), and a longitudinal residual magnetization Mr is less than 0.2 times the saturation magnetization Ms.

7. An apparatus according to claim 6, wherein said perpendicular magnetic layer comprises a cobalt-platinum-based magnetic layer containing at least chromium or oxygen.

8. An apparatus according to claim 6, further comprising an underlayer having a stacked structure including a ruthenium-containing layer formed in a high-pressure argon atmosphere and a ruthenium-containing layer formed in a low-pressure argon atmosphere.

9. An apparatus according to claim 8, comprising a soft magnetic layer formed between said perpendicular magnetic layer and said underlayer.

10. An apparatus according to claim 6, wherein the value of $Hk/4\pi Ms$ in equation (1) is preferably 2.5 to 4.5.

* * * * *